2 Sheets—Sheet 1.

W. COPLIN, dec'd.

N. COPLIN, assignee.

Millstone Dressing-Machine.

No. 8,377. Reissued Aug. 13, 1878.

*Witnesses:*
*J. J. Masson*
*D. P. Lowe*

*Inventor*
*Wilbur Coplin*
*Norman Coplin, assignee,*
*by E. E. Masson atty.*

N. PETERS, PHOTO-LITHOGRAPHER, WASHINGTON, D. C.

W. COPLIN, dec'd.

N. COPLIN, assignee.

Millstone Dressing-Machine.

No. 8,377. Reissued Aug. 13, 1878.

Witnesses
J. J. Masson
S. P. Bowl

Inventor
Wilbur Coplin
Norman Coplin, assignee,
by E. E. Masson atty.

G. SETERS, PHOTO-LITHOGRAPHER, WASHINGTON, D. C.

UNITED STATES PATENT OFFICE.

NORMAN COPLIN, OF CANNON FALLS, MINNESOTA, ASSIGNEE OF WILBUR COPLIN, DECEASED.

IMPROVEMENT IN MILLSTONE-DRESSING MACHINES.

Specification forming part of Letters Patent No. 180,006, dated July 18, 1876; Reissue No. 8,377, dated August 13, 1878; application filed August 2, 1878.

*To all whom it may concern:*

Be it known that WILBUR COPLIN, of Lockport, in the county of St. Joseph and State of Michigan, now deceased, did during his life-time invent certain new and useful Improvements in Millstone-Dressing Machines; and I do hereby declare the following to be a full, clear, and exact description thereof, which will enable others skilled in the art to which the invention appertains to make and use the same, reference being had to the accompanying drawings, forming part of this specification, in which—

Figure 1:
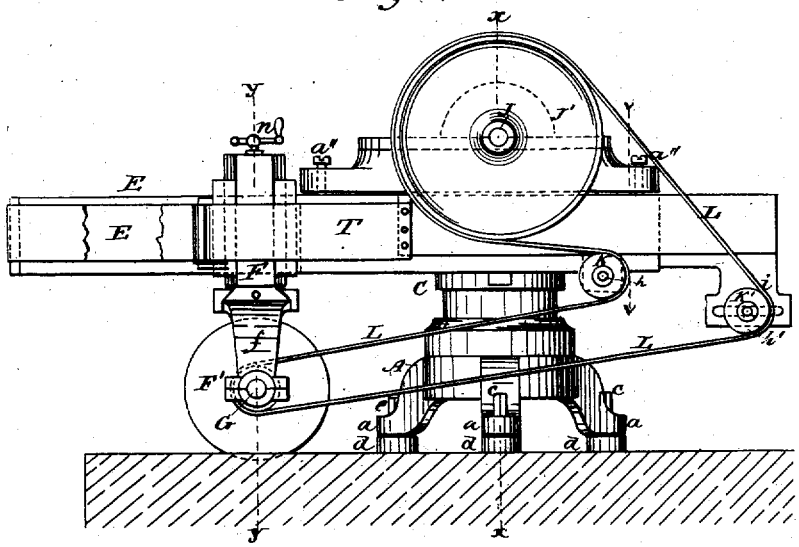
Figure 2:
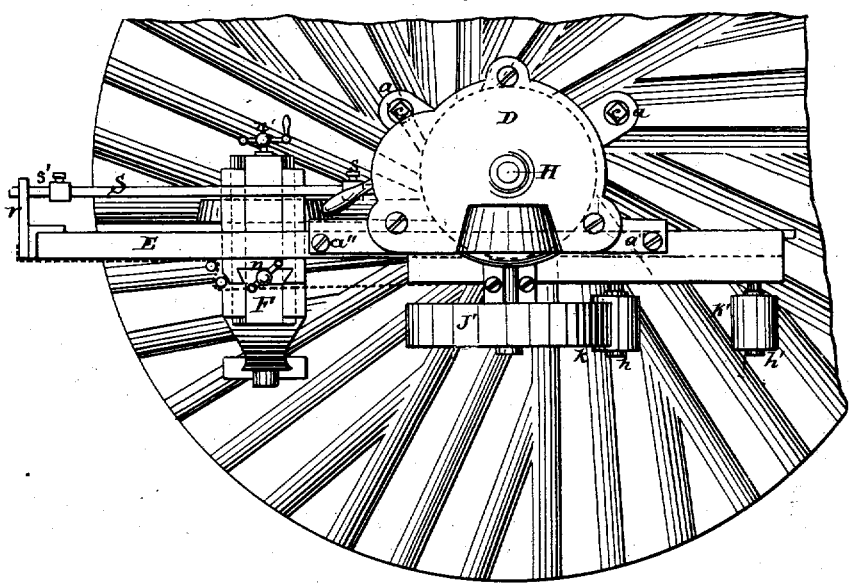
Figure 3:
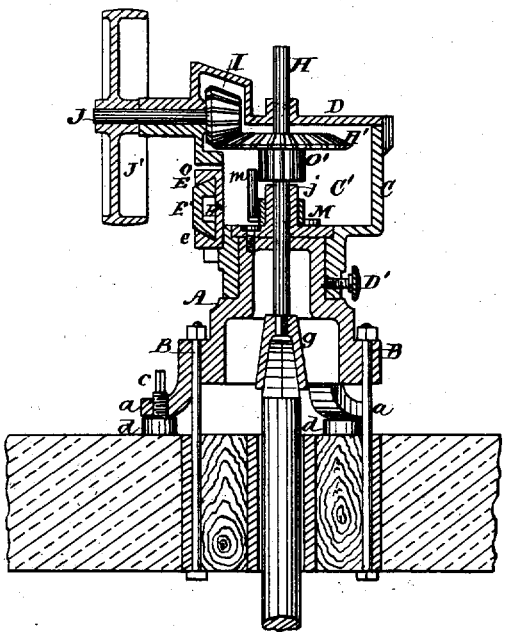
Figure 5:
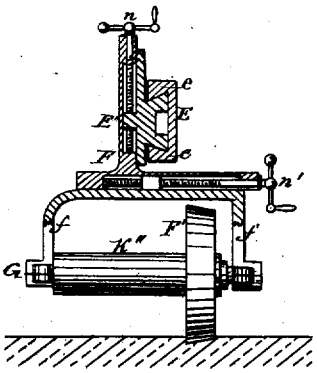
Figure 12:
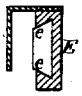
Figure 4:
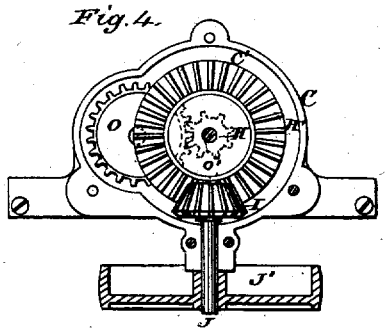
Figure 7:
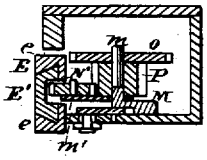
Figure 6:
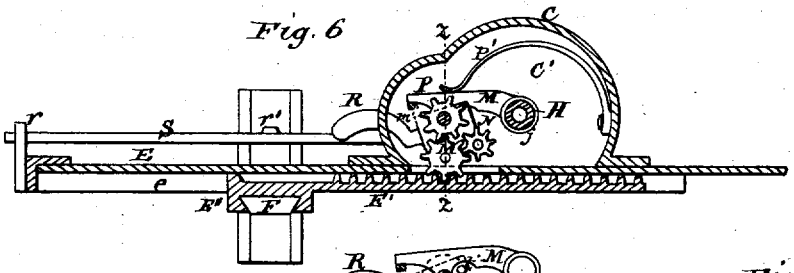

Figure 1 represents a side elevation of a millstone-dressing machine embodying the said invention. Fig. 2 represents a general plan or top view of the same when secured to the millstone, showing the angles of the furrows and position of the arm carrying the cutter. Fig. 3 represents a vertical transverse section taken on line *x x*, drawn across Fig. 1. Fig. 4 represents a general plan or top view of the turn-table with cover removed, showing the arrangement of gearing employed in transmitting motion to the wheel operating the cutter. Fig. 5 represents a vertical transverse section taken on the line *y y*, drawn across Fig. 1. Fig. 6 represents a general plan of the parts employed in transmitting a reciprocal movement to the parts carrying the cutter. Fig. 7 represents a vertical transverse section of the same, taken on the line *z z*, drawn across Fig. 6. Figs. 8, 9, 10, and 11 are diagrams of gear-wheels and shipping-lever employed in determining the direction of the movement of the parts carrying the cutter; and Fig. 12 represents a cross-section of the arm supporting the cutter, taken on line *v v*, drawn across Fig. 1.

Like letters of reference indicate like parts.

The invention relates to that class of millstone-dressing machines employed in forming the furrows on the face of the stone; and its object is to provide a machine that will cut an accurate and true furrow without being wavy or glazed, and leaving the feather-edge sharp and well defined; also, to provide a means of protecting the working parts from the dust and grit arising from the cutting away of the stone, and to so arrange the operating parts as to be under the complete and instantaneous control of the operator.

To that end the invention consists in the several combinations of parts whereby the objects, as aforesaid, are attained, as will be more fully understood from the following description.

In the drawing, A represents the base of the machine, which is made of cast metal, and is provided with radial depending feet *a a a*, through which pass the adjusting-screws *c*, connected at their lower ends to the loose collars *d*, adapted to rest upon the surface and near the center of the stone. B B are the connecting-rods for securing the machine to the stone. C is a turn-table, made of cast metal and journaled to the base A, and so arranged as to freely revolve. The turn-table is made hollow, forming a chamber, C′, within which the gear-wheels employed in operating the feed and cutter wheel are secured, as will be hereinafter referred to, and is provided with a cover, D, adapted to tightly close the chamber, by which means the dust and grit arising from the cutting of the stone are prevented from coming in contact with the gear-wheels and their respective journals.

D′ is a set-screw secured within the shell of the turn-table, and adapted to bear against the journal of the base, by which means the turn-table is secured in a fixed position when adjusted to the desired point. E is a horizontal arm, permanently attached to the side of the turn-table, and arranged to revolve with it. This arm is of the proper length to extend outward slightly beyond the periphery of the stone, and is constructed in a manner suitable to cover and support the outer edges of the carrier E″ and rack E′, and thereby protect its oily surfaces from grit and dust when acting in conjunction with apron T, hereinafter mentioned, and is arranged in such a position relative to the radius of the stone as to be in a plane parallel with the radial plane of the furrows in the face of the stone when the turn-table is set at the proper point, and is so attached to the turn-table as to admit of being adjusted vertically to a plane parallel with the horizontal plane of the furrows to be cut, and firmly held in position relative to the plane of the furrows by the adjusting screws or bolts $a''$ $a''$ screwing into or against the surface of the arm, making the same adjustable at one or both ends, and, if desired, the arm may be wholly supported thereby.

E′ is a sliding rack connected to and operating carrier E″, which is secured to the arm E by the projecting guides or ways *e e*, and arranged to admit of a reciprocating longitudinal movement. F is a cross-head attached to carrier E″, and arranged to move with it. This cross-head is so adjusted as to admit of being raised or lowered, as may be required, and moved to the right or left in a plane at a right angle to the plane of the arm, independent of any lateral movement of the carrier. F′ is a cutter-wheel mounted on a horizontal shaft, G, journaled to pendants *f f* attached to the cross-head, and so arranged as to move with the cross-head. H is a vertical shaft extending upward above cover D of the turn-table and downward into the center of base A, as shown in Fig. 3, and arranged to admit of a free and easy rotary movement, and is also so arranged that when the machine is adjusted to the face of the stone its lower end is immediately above the spindle employed in revolving the upper stone, and is connected thereto by passing into a socket, *g*, fitted upon the upper end of the spindle, by which means a rotary movement is imparted to the shaft by a rotary movement of the spindle. H′ is a beveled gear-wheel mounted on shaft H, and adjusted to engage with a corresponding gear-pinion, I, on shaft J, journaled in boxes secured to the turn-table above arm E. Mounted on shaft J is a driving-wheel, J′, for imparting motion to the cutter-wheel. K is a take-up pulley, loosely mounted upon a trunnion-shaft, *h*, rigidly secured to the rear end of carrier E″, as shown in Fig. 1. K′ is a tightening-pulley, loosely mounted on a trunnion-shaft, *h′*, adjustably secured to a pendant, *i*, rigidly attached to the rear end of arm E. K″ is the driving-drum, permanently mounted on the shaft G of the cutter-wheel. L is the driving-belt for communicating motion to the cutter, which passes over the driving-wheel J′, and is so adjusted that its front or driving part passes back of and partly around pulley K, while its rear or loose part passes back of and partly around pulley K′, thence forward and around the driving-drum K″, as shown in Fig. 1. By this arrangement of the pulleys relative to the arm and carrier carrying the cutter-wheel, the carrier, and consequently the cutter-wheel, can be moved forward or backward in the direction of the length of the furrow without changing the tension of the belt; and the cutter-wheel can be adjusted laterally in the cross-head, from the long furrow to the short furrows in the same section, without adjusting the arm, the length of the driving-drum being such as to admit of the lateral adjustment of the cutter-wheel.

M is a vibrating arm, journaled upon a vertical hub, *j*, secured to the center of the base A, and through which shaft H loosely passes. This arm rests upon the upper surface of the base, and is provided at its end opposite to the hub with a vertical trunnion-shaft, *m*, to which is journaled a horizontally-vibrating plate, *m′*, carrying intermediate gear-pinions N N′, engaging with each other, and adapted to alternately engage with rack E′ when the plate is adjusted to its proper position, either forward or backward. Loosely mounted on trunnion-shaft *m* is a gear-wheel, O, adjusted to engage with a corresponding gear-pinion, O′, permanently attached to the lower surface of the wheel H′ on shaft H. P is a gear-pinion permanently attached to the lower surface of wheel O on trunnion-shaft *m*, and adapted to engage with pinion N′, by which means a rotary movement is imparted to said pinions N N′ by the rotation of shaft H moving the rack forward and backward as the pinions are alternately engaged therewith. The arrangement of these gear-wheels and pinions is such as to decrease the velocity of each wheel receding from shaft H, by which means the rack is moved at the requisite speed to allow the cutter-wheel to freely cut its path through the stone as it is revolved in contact therewith.

P′ is adjusting-spring attached to the inner surface of the turn-table, and adapted to bear against the edge of arm M at a point near trunnion *m*, as shown in Fig. 6. R is a shipping-lever, fulcrumed to the base of the turn-table and extending outward longitudinally through a mortise formed in the wall of the shell. The inner end of this lever is adapted to alternately bear against stop-pins *t t′* located on the lower surface of the plate adjacent to the trunnion *m* on arm M, by which means an outward movement is imparted to the plate by the contact of the lever with pin *t* as the outer end of the lever is moved from the rack.

Figure 10:
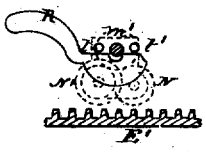
Figure 8:
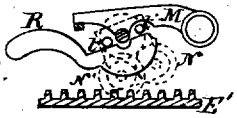
Figure 11:
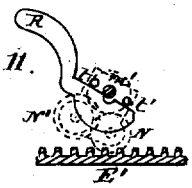
Figure 9:
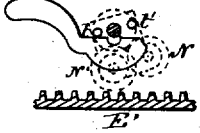

The arrangement of said lever and plate relative to the intermediate gear-pinions and spring P′ is such that, when the outer end of the lever has reached the limit of its movement toward rack E′, pinion N′ engages with the rack, as shown in Figs. 6 and 8, and is held in contact by the tension of the spring moving the rack outward; and when the lever is moved from the rack to the position shown in Fig. 9, the plate moved outward at a right angle from the rack, disengaging pinion N′ therefrom, when the tension of the spring forces the plate back to the position shown in Fig. 10, and by a further movement of the lever to the position shown in Fig. 11 the plate is moved to the proper position to cause pinion N to engage with the rack, moving it in the opposite direction.

S is the shifting-rod, pivoted at its inner end to the inner end of shipping-lever R, and loosely secured at its outer end by passing through a mortise in plate *r*, attached to the end of arm E. Mounted upon said shifting-rod S are adjustable trip-blocks *s s′*, arranged to admit of being firmly secured at any desired point thereon. Permanently attached to the end of the cross-head is a vertical upright, $r'$, adapted to alternately engage the trip-blocks as the cross-head has reached the limit of its movement, by which means a longitudinal movement is imparted to the shifting-rod, moving the shipping-lever, so as to alternately engage and disengage pinions N N′ from the rack, reversing its movement.

T is an apron, attached at its ends to arm E, and so arranged as to prevent the dust and grit arising from the cutting of the stone from coming in contact with the guides or ways on which the rack moves.

The cutter-wheel may be made of any suitable material that will perform the function of cutting the furrows in the face of the stone.

The operation of my said millstone-dressing machine is as follows: The machine being properly adjusted to the face of the stone by the connecting-rods B B, so as to bring arm E in the same vertical plane with the long furrow to be formed, and allowing shaft H to enter the socket on the spindle, as previously described, the base of the machine is then adjusted by means of the screws *c* so as to bring the horizontal plane of the arm parallel with the horizontal plane of the face of the stone, and cross-head F adjusted laterally, so as to bring the cutter-wheel F′ to the line of the furrow. The rack E′ being moved inward, so as to bring the cutter-wheel at the inner end of the furrow, the shipping-lever R is moved toward the rack, so as to engage pinion N′ therewith, and the trip-blocks *s s′* adjusted on the shifting-rod S to determine the distance which the cutter is to move in forming the furrow. Motion is then imparted to the spindle, consequently to shaft H, thereby communicating a rotary motion to the cutter through the medium of gear-wheel H′, pinion I, shaft J, wheel J′, belt L, and drum K″ of the cutter-shaft, and at the same time imparting a longitudinal movement to the rack through the medium of gear-pinion O′, wheel O, pinions P and N′, moving the rack outward until the cutter-wheel reaches the periphery of the stone, when upright $r'$ of the cross-head is brought in contact with trip-block $s'$ of the shifting-rod, moving the latter outward, which shifts the shipping-lever, disengaging pinion N′ from the rack and engaging pinion N therewith, as previously described, when the movement of the rack is reversed through the medium of pinion N, and the cutter-wheel carried back to the inner end of the furrow, bringing upright $r'$ in contact with the trip-block *s*, disengaging pinion N from the rack, and again engaging pinion N′ therewith, when the rack moves outward, the cross-head being properly depressed by the adjusting-screw *n* at each reciprocal movement of the rack, so as to bring the periphery of the cutter-wheel in contact with the base of the furrow, and the machine kept in motion until the furrow is complete. The shipping-lever is then so adjusted by the operation as to disengage both pinions N and N′ from the rack, preventing a further reciprocating movement of the same, when set-screw D′ is loosened, and the turn-table moved so as to bring the arm in a vertical plane with the vertical plane of the next long furrow to be finished, and the shipping-lever so readjusted as to engage one of the pinions N or N′ with the rack, and again imparting a reciprocating movement to the rack, as before. The arm is adjusted to the plane of each long furrow in the face of the stone until all is finished. The shipping-lever is then adjusted to disengage both pinions N N′ from the rack, when the arm is adjusted to a plane parallel with the middle furrow by turning the turn-table, as previously stated, and the cutter-wheel adjusted laterally in the cross-head to the furrow by the set-screw $n'$. The shipping-lever is then adjusted so as to engage one of the pinions N or N′ with the rack, when a reciprocating movement is imparted thereto, and the machine continued in motion until the furrow is completed. The parts are then readjusted to the next middle furrow, in the same manner as when cutting the long furrows, and so on until all the middle furrows are complete. The cutter-wheel is then moved over in the cross-head to the first short furrow by the set-screw $n'$, and when the latter furrow is completed the arm is set over to bring the cutter-wheel to the next short furrow by adjusting the turn-table, as before, and so on until all of the short furrows are completed.

What I claim as the invention of said WILBUR COPLIN is—

1. The combination of the gear-wheels I and H with the system of feeding-gears N N′, P, O, and O′, carrier E″, and double cross-head F, whereby a reciprocating movement is imparted to the cutter-wheel simultaneously with a rotary movement of the same, substantially as and for the purpose specified.

2. The arm E, constructed with projecting flanges, and provided with a carrier, E″, and rack E′, supported by said projecting flanges or guides, and made adjustable on the turn-table by means of set-screws, substantially as and for the purpose specified.

3. In combination with wheel J′, pulley K′, drum K″, and carrier E′, the take-up pulley K, substantially as and for the purpose specified.

4. In combination with rack E′, the pinions N N′, pinion P, wheel O, and pinion O′, acting in conjunction to impart a reciprocating movement to each by a rotary movement of the center-shaft H, as and for the purpose specified.

5. In combination with pinions N N′ and plate *m*, the shipping-lever R, substantially as and for the purpose specified.

6. In combination with pinions N N′, plate *m*, and shipping-lever R, the shifting-rod S, provided with the stop-blocks *s s′*, adapted to be operated by upright $r$ $r'$ of the cross-head, substantially as and for the purpose specified.

7. In combination with plate $m$, carrying the pinions N N′, the adjusting-spring P′, substantially as and for the purpose specified.

8. The combination of the reciprocating carrier E″ on the arm E, the vertically-adjustable cross-head F, and the laterally-adjustable frame and pendants $f$ $f$, carrying the long pulley and cutter-wheel, to admit of both vertical and lateral adjustment of the cutter to the furrow, substantially as specified.

9. In combination with the turn-table C, carrying the gear-wheel, the cover D, arranged to tightly close the chamber containing gear, and providing a top journal for the shaft H, substantially as specified.

10. The apron T, in combination with arm E, substantially as and for the purpose specified.

11. The hollow extension of the turn-table, incasing its gears and working parts from dust and grit, substantially in the manner shown and specified.

12. The driving-drum or long pulley K″, fastened to the shaft G, in combination with pendants $f$ $f$ and double cross-head F, substantially as and for the purpose specified.

NORMAN COPLIN.

Witnesses:
J. F. GRAVES,
F. D. RHOADS.